(12) United States Patent  
Sun et al.

(10) Patent No.: US 12,081,874 B2  
(45) Date of Patent: Sep. 3, 2024

(54) CAMERA MULTI-LINE TIME-DIVISION EXPOSURE PROCESSING METHOD AND SYSTEM

(71) Applicant: HEFEI I-TEK OPTOELECTRONICS CO., LTD., Anhui (CN)

(72) Inventors: Haixing Sun, Anhui (CN); Ning Dong, Anhui (CN); Guiping Cao, Anhui (CN); Xue Wang, Anhui (CN)

(73) Assignee: HEFEI I-TEK OPTOELECTRONICS CO., LTD., Anhui (CN)

( * ) Notice: Subject to any disclaimer, the term of this patent is extended or adjusted under 35 U.S.C. 154(b) by 126 days.

(21) Appl. No.: 17/863,557

(22) Filed: Jul. 13, 2022

(65) Prior Publication Data

US 2022/0345609 A1   Oct. 27, 2022

Related U.S. Application Data

(63) Continuation of application No. PCT/CN2020/129415, filed on Nov. 17, 2020.

(30) Foreign Application Priority Data

Mar. 20, 2020   (CN) .......................... 202010202713.1

(51) Int. Cl.  
*H04N 23/72*   (2023.01)  
*H04N 1/195*   (2006.01)  
(Continued)

(52) U.S. Cl.  
CPC ......... *H04N 23/72* (2023.01); *H04N 1/19594* (2013.01); *H04N 5/265* (2013.01);  
(Continued)

(58) Field of Classification Search  
CPC .... H04N 23/72; H04N 1/19594; H04N 5/265; H04N 23/45; H04N 23/56;  
(Continued)

(56) References Cited

U.S. PATENT DOCUMENTS

2018/0367722 A1   12/2018   Hashiguchi et al.

FOREIGN PATENT DOCUMENTS

| CN | 2560965 Y | 7/2003 |
|---|---|---|
| CN | 101309339 A | 11/2008 |

(Continued)

OTHER PUBLICATIONS

Translation of CN 110530796 (Year: 2019).*

(Continued)

*Primary Examiner* — Twyler L Haskins  
*Assistant Examiner* — Angel L Garces-Rivera

(57) ABSTRACT

Provided are a camera multi-line time-division exposure processing method and a system. N sensor lines correspond to the n light sources in a one-to-one correspondence. The sensor lines is configured to respectively collect image data of an object moving through the camera's field of view along one direction under the corresponding light sources. The method includes: obtaining a trigger signal to trigger at one time the n light sources to turn on and off sequentially, collecting image data of the object exposed under a turned-on light source, and extracting image data of the object obtained by one sensor line corresponding to the turned-on light source as valid data; splicing all the valid data of the same portion of the object to obtain a spliced image under different light sources; and cyclically outputting the spliced image to obtain a complete image of the object.

8 Claims, 4 Drawing Sheets

(51) Int. Cl.
  *H04N 5/265* (2006.01)
  *H04N 23/45* (2023.01)
  *H04N 23/56* (2023.01)
  *H04N 101/00* (2006.01)

(52) U.S. Cl.
  CPC ............. *H04N 23/45* (2023.01); *H04N 23/56* (2023.01); *H04N 2101/00* (2013.01)

(58) Field of Classification Search
  CPC .... H04N 2101/00; H04N 25/53; H04N 23/74; H04N 23/73; H04N 23/54
  See application file for complete search history.

(56) References Cited

FOREIGN PATENT DOCUMENTS

| | | |
|---|---|---|
| CN | 102192729 A | 9/2011 |
| CN | 103884650 A | 6/2014 |
| CN | 104841646 A | 8/2015 |
| CN | 104869307 A | 8/2015 |
| CN | 106534632 A | 3/2017 |
| CN | 110166766 A | 8/2019 |
| CN | 110376207 A | 10/2019 |
| CN | 110530796 A | 12/2019 |
| CN | 110646431 A | 1/2020 |
| CN | 110876020 A | 3/2020 |
| CN | 111327835 A | 6/2020 |
| CN | 111327836 A | 6/2020 |
| JP | 2022542412 A | 10/2022 |
| KR | 1020100081197 A | 7/2010 |
| KR | 101473569 B1 | 12/2014 |

OTHER PUBLICATIONS

International Search Report and Written Opinion dated Jan. 22, 2021 in International Application No. PCT/CN2020/129415. English translation attached.
First Office Action from corresponding Chinese Application No. 202010202713.1, dated Feb. 1, 2021. English translation attached.
The Grant Notice from corresponding Chinese Application No. 202010202713.1, dated Jun. 1, 2021. English translation attached.
Second Office Action received in Japan Patent Application No. JP2022-542411, dated Sep. 19, 2023. English translation attached.
Grant Notice received in Japan Patent Application No. JP2022-542411, dated Nov. 21, 2023. English translation attached.
First Office Action dated Jun. 6, 2023 received in Japan Patent Application No. JP2022-542411.English translation attached.
First Office Action dated May 21, 2024 received in corresponding patent family application No. KR10-2022-7023241. English translation attached.

* cited by examiner

CAMERA MULTI-LINE TIME-DIVISION EXPOSURE PROCESSING METHOD AND SYSTEM

CROSS-REFERENCES TO RELATED APPLICATIONS

This application is a continuation of International Application No. PCT/CN2020/129415, filed on Nov. 17, 2020, which claims priority to Chinese Patent Application No. 202010202713.1, filed on Mar. 20, 2020, and titled "CAMERA MULTI-LINE TIME-DIVISION EXPOSURE PROCESSING METHOD AND SYSTEM". The disclosures of the aforementioned applications are hereby incorporated by reference in their entireties.

FIELD

The present disclosure relates to the technical field of industrial image collection of machine vision, in particular to a camera multi-line time-division exposure processing method and system.

BACKGROUND

Due to the high-speed collection of the line scan camera, each time a line is collected, it just moves to the next unit length, and continues to collect the next line, so that a two-dimensional picture is spliced after a period of time, so the industrial line scan camera plays an important role in the image collection. At present, most of the industrial line scan cameras commonly used in the market are single line scan cameras. However, in the actual detection and scanning operation, the image information obtained by the single line camera often results in lack of information and insufficient image information due to problems such as light sources, etc.

In view of the above defects of single line cameras, the traditional common processing method is to use a plurality of single line cameras cooperating with a plurality of light sources to scan the object to obtain more image information, but this method is not only cumbersome and slow in operation, but also because the number of cameras is increased, the size of the device is too large, which is inconvenient in practical application, and high in the cost. Therefore, with the continuous improvement of the machine vision industry's requirements for the image scanning speed and the image information amount, single line scanning cameras may no longer meet the needs of many industries.

SUMMARY

Based on the technical problems existing in the background technology, the present disclosure proposes a camera multi-line time-division exposure processing method and system, which uses one camera and a plurality of light sources to scan a moving object, and has the advantages of high collection efficiency, small size, and high image recognition.

A camera multi-line time-division exposure processing method proposed by the present disclosure involves a camera and n light sources. The number of N sensor lines of the camera is equal to the number of the n light sources, and the N sensor lines correspond to the n light sources in a one-to-one correspondence. A plurality of sensor lines of the N sensor lines is configured to respectively collect image data of an object moving through the camera's field of view along one direction under the corresponding light sources. The method includes: obtaining a trigger signal to trigger at one time, based on the trigger signal, the n light sources to turn on and off sequentially, collecting image data of the object exposed under a corresponding turned-on light source; splicing, in response to that image data of a same portion of the object is collected by the plurality of lines of the sensor, all the valid data of the same portion of the object to obtain a spliced image under different light sources; and cyclically outputting the spliced image in a loop to obtain a complete image of the object.

Further, in said obtaining the trigger signal to trigger at the time, based on the trigger signal, the n light sources to turn on and off sequentially, collecting the image data of the object exposed under the corresponding turned-on light source, said obtaining the trigger signal includes: obtaining a trigger signal triggered by each moving length Δl of the object. The length Δl corresponds to a length Δl of the object that is collectable by each sensor. The object is divided equally based on the length Δl.

Further, in said splicing, in response to that image data of the same portion of the object is collected by the plurality of lines of the sensor, all the valid data of the same portion of the object to obtain the spliced image under different light sources, said splicing the valid data includes: writing image data of the same portion of the object collected by the plurality of sensor lines at different times into a plurality of image caches, where the plurality of image caches corresponds to the plurality of sensor lines in a one-to-one correspondence; and aligning the image data of the same portion in the plurality of image caches, and sequentially outputting the image data of the same portion of the object collected by the plurality of sensor lines to obtain the spliced image under the different light sources.

Further, when the image data of the same portion in the plurality of image caches are aligned, a line delay is performed on the plurality of sensor lines to align the image data of the same portion.

Further, in said the number of N sensor lines of the camera being equal to the number of the n light sources, and the N sensor lines corresponding to the n light sources in a one-to-one correspondence, the n-th light source is set as Lamp_n, the n-th sensor line of the camera is set as Ln, and a correlation relationship between Lamp_n and Ln is that: when Lamp_n is turned on, the image data obtained by Ln under a turned-on light source Lamp_n is extracted.

Further, the plurality of sensor lines of the camera each is arranged in a line and spaced apart from each other by a fixed distance; and when a pixel of the camera is set as a×a, the fixed distance is set as a.

A camera multi-line time-division exposure processing apparatus, including a camera and n light sources. The N number of sensor lines of the camera is equal to the number of the n light sources and the N sensor lines correspond to the n light sources in a one-to-one correspondence. A plurality of sensor lines of the N sensor lines is configured to respectively collect image data of an object moving through the camera's field of view along one direction under the corresponding light sources. The apparatus includes: a trigger obtaining module configured to obtain a trigger signal to trigger at one time, based on the trigger signal, the n light sources to turn on and off sequentially, collect image data of the object exposed under a corresponding turned-on light source, and extract image data of the object obtained by one sensor line corresponding to the turned-on light source as valid data; a splicing module configured to splice, in response to that image data of a same portion of the object is collected by the plurality of sensor lines, all the valid data of the same portion of the object to obtain a spliced image under different light sources; and a cyclic output module configured to cyclically output the spliced image to obtain a complete image of the object.

Further, the splicing module includes a cache module configured to write image data of the same portion of the object collected by the plurality of sensor lines at different times into a plurality of image caches, where the plurality of image caches corresponds to the plurality of sensor lines in a one-to-one correspondence; and an alignment output module configured to align the image data of the same portion in the plurality of image caches, and sequentially output the image data of the same portion of the object collected by the plurality of sensor lines to obtain the spliced image under different light sources.

A camera multi-line time-division exposure processing apparatus includes a memory having a computer program stored thereon; and a processor, where the computer program, when being executed by the processor, implements the following steps: obtaining a trigger signal to trigger at one time, based on the trigger signal, the n light sources to turn on and off sequentially, collecting image data of the object exposed under a turned-on light source, and extracting image data of the object obtained by one sensor line corresponding to the turned-on light source as valid data; splicing, in response to that image data of a same portion of the object is collected by the plurality of lines of the sensor, all the valid data of the same portion of the object to obtain a spliced image under different light sources; and cyclically outputting the spliced image to obtain a complete image of the object.

A computer-readable storage medium has a plurality of obtaining and classifying programs stored thereon, where the plurality of obtaining and classifying programs, when being called and executed by a processor, implements the following steps: obtaining a trigger signal to trigger at one time, based on the trigger signal, the n light sources to turn on and off sequentially, collecting image data of the object exposed under a turned-on light source, and extracting image data of the object obtained by one sensor line corresponding to the turned-on light source as valid data; splicing, in response to that image data of a same portion of the object is collected by the plurality of lines of the sensor, all the valid data of the same portion of the object to obtain a spliced image under different light sources; and cyclically outputting the spliced image to obtain a complete image of the object.

The advantages of the camera multi-line time-division exposure processing method and system provided by the present disclosure are that the camera multi-line time-division exposure processing method and system provided in the structure of the present disclosure use one camera and a plurality of light sources to cooperate and scan a moving object with high frequency and has the advantages of high collection efficiency, small size and high image recognition. The method makes the device space compact, and integrates the traditional features detected by a plurality of stations into one position for detection, avoiding errors caused by a plurality of station detection; it may synchronously analyze the features of the object under a plurality of illuminations, effectively improving recognition efficiency; and the line delay is used to obtain the image data of the same position, which then is spliced and output to obtain the spliced images under different light sources, and then to obtain the complete image of the object.

1—trigger obtaining module, 2—splicing module, 3—cyclic output module, 21—cache module, 22—alignment output module.

DESCRIPTION OF EMBODIMENTS

The technical solutions of the present disclosure will be described in detail below through specific embodiments.

Figure 1:
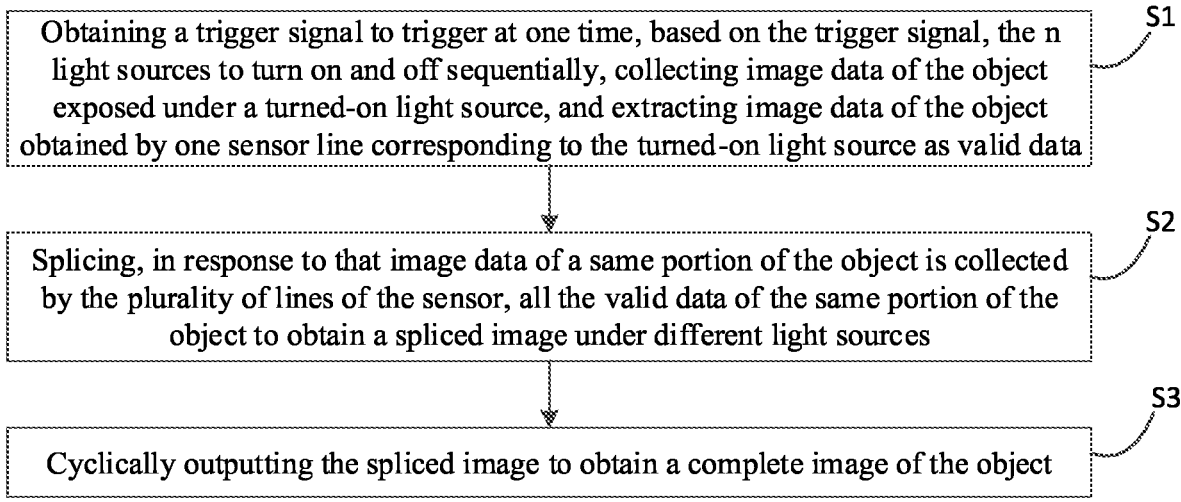
FIG. 1 is a flowchart of steps of a camera multi-line time-division exposure processing method according to the present disclosure.

Referring to FIG. 1, a camera multi-line time-division exposure processing method involves a camera and n light sources. The number of N sensor lines of the camera is equal to the number of the n light sources, and the N sensor lines correspond to the n light sources in a one-to-one correspondence. A plurality of sensor lines of the N sensor lines are configured to respectively collect image data of an object moving through the camera's field of view along one direction under the corresponding light sources and the method includes the following steps.

At S1, a trigger signal is obtained to trigger at one time, based on the trigger signal, the n light sources to turn on and off sequentially, image data of the object exposed under a corresponding turned-on light source is collected, and image data of the object obtained by one sensor line corresponding to the turned-on light source is extracted as valid data.

At S2, in response to that image data of a same portion of the object is collected by the plurality of lines of the sensor, all the valid data of the same position of the object are spliced to obtain a spliced image under different light sources.

At S3, the spliced image is cyclically output to obtain a complete image of the object.

Through steps S1 to S3, one camera is used with different light sources to sequentially perform high-frequency exposure processing on the object under different light sources, and the valid image data of the object at the same position obtained by the plurality of lines of the sensor of the camera are spliced to obtain image information under all light sources, and sufficient data required for subsequent image processing may be obtained. The method has the characteristics of small size and high collection efficiency, and compared with other methods, the cost is lower, which reflects the superior cost performance; the method makes the device space compact, and integrates the features originally detected by a plurality of stations into one position for detection, avoiding errors caused by a plurality of station detection; and it may synchronously analyze the features of the object under a plurality of illuminations, effectively improving recognition efficiency.

Specifically, the camera is controlled and connected to a plurality of light source signals. The first line of the sensor is connected to the first light source signal, and the connection relationship is that: when the first light source signal is turned on, the data obtained by the first line is taken as valid data; the second line of the sensor is connected to the second light source signal, and the connection relationship is that: when the second light source signal is turned on, the data obtained by the second line is taken as valid data; and deducing in turn, till the plurality of lines of each sensor in the camera has signal connections to different light sources.

It should be understood that the sensor with the plurality of lines of the sensor of the camera has at least two lines, and when the camera is a four-line scan camera, it means that the sensor has four lines. When the light sources corresponding to the plurality of lines of the sensor are turned on, the image data obtained by the sensor at the time is taken as valid data, and the time interval between sequential turning on—offs of a plurality of light sources is within the light source control range. The plurality of light sources may be light sources with different wavelengths or light sources with different brightness.

Further, at S1, obtaining the trigger signal includes the following steps.

At S11, the length $\Delta l$ of the object that is collectable by each sensor line in the camera is calculated.

When each pixel of the sensor of the camera is a×a, a plurality of pixels is arranged in a line, each line is spaced by a, and the sequence of the plurality of lines of the sensor is set to be L1 to Ln, the magnification of the optical path of the camera is set to be β, and the length of the object that can be captured by each of the plurality of lines of each sensor is set to be $\Delta l=a/\beta$.

At S12, the trigger signal is triggered by each moving length $\Delta l$ of the object.

Every time the object moves $\Delta l$, a trigger signal is generated, the light sources are triggered to be turned on and off sequentially, and the camera collects data at one time.

It should be understood that the magnification of optical path of the camera is known for the camera that has been determined, that is, it may be obtained directly. There is a signal control connection relationship between the motion of the object and the camera and the power supply, respectively. At one time, the images captured by the camera under different light sources may reach the set pixels.

Further, the number of N sensor lines of the camera is equal to the number of the n light sources, and the N sensor lines correspond to the n light sources in a one-to-one correspondence, the n-th light source is set as Lamp_n, the n-th sensor line of the camera is set as Ln, and a correlation relationship between Lamp_n and Ln is that: when Lamp_n is turned on, the image data obtained by Ln is extracted as valid data.

Further, at S2, in response to that image data of the same portion of the object is collected by the plurality of lines of the sensor, all the valid data of the same position of the object are spliced to obtain the spliced image under the different light sources, said splicing the valid data includes the following steps.

At S21, image data of the same position of the object collected by the plurality of sensor lines at different times is written into a plurality of image caches, and the plurality of image caches corresponds to the plurality of sensor lines in a one-to-one correspondence.

At S22, the image data of the same portion in the plurality of image caches is aligned, and the image data of the same position of the object collected by the plurality of lines of the sensor is sequentially output to obtain the spliced images under the different light sources.

It should be understood that when the collection for the object is continuous, the plurality of lines of the sensor are photosensitive collection, caching, and image processing at each time. If the collection for the object is not continuous, the plurality of lines of the sensor are photosensitive collection, caching, and image processing at the set time.

Since there is a fixed physical distance between the plurality of lines of the sensor, the data captured at the same time is not the image information of the same position, and the image will be misaligned when the image is output. Therefore, the image data is aligned through steps S21 to S22, different parts of the cache are used to cache the data of different lines at different times, then line delay is performed to obtain the image data of the same position, which then is spliced and output to complete the normal combination of images.

Figure 2:
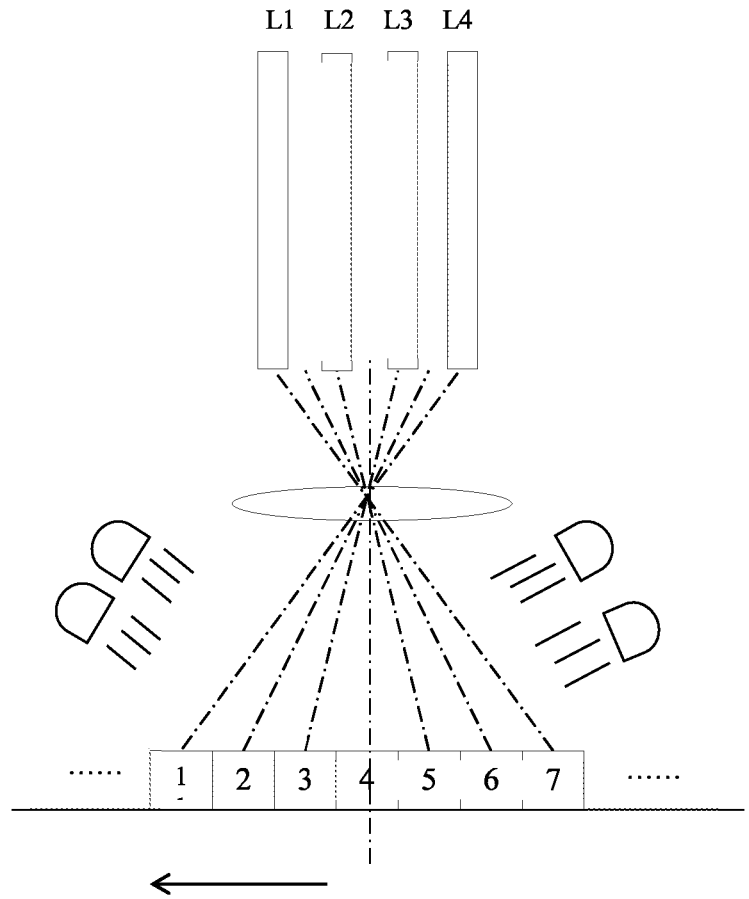
FIG. 2 is a structural schematic diagram of a camera multi-line time-division exposure processing method according to an embodiment of the present disclosure.
Figure 3:
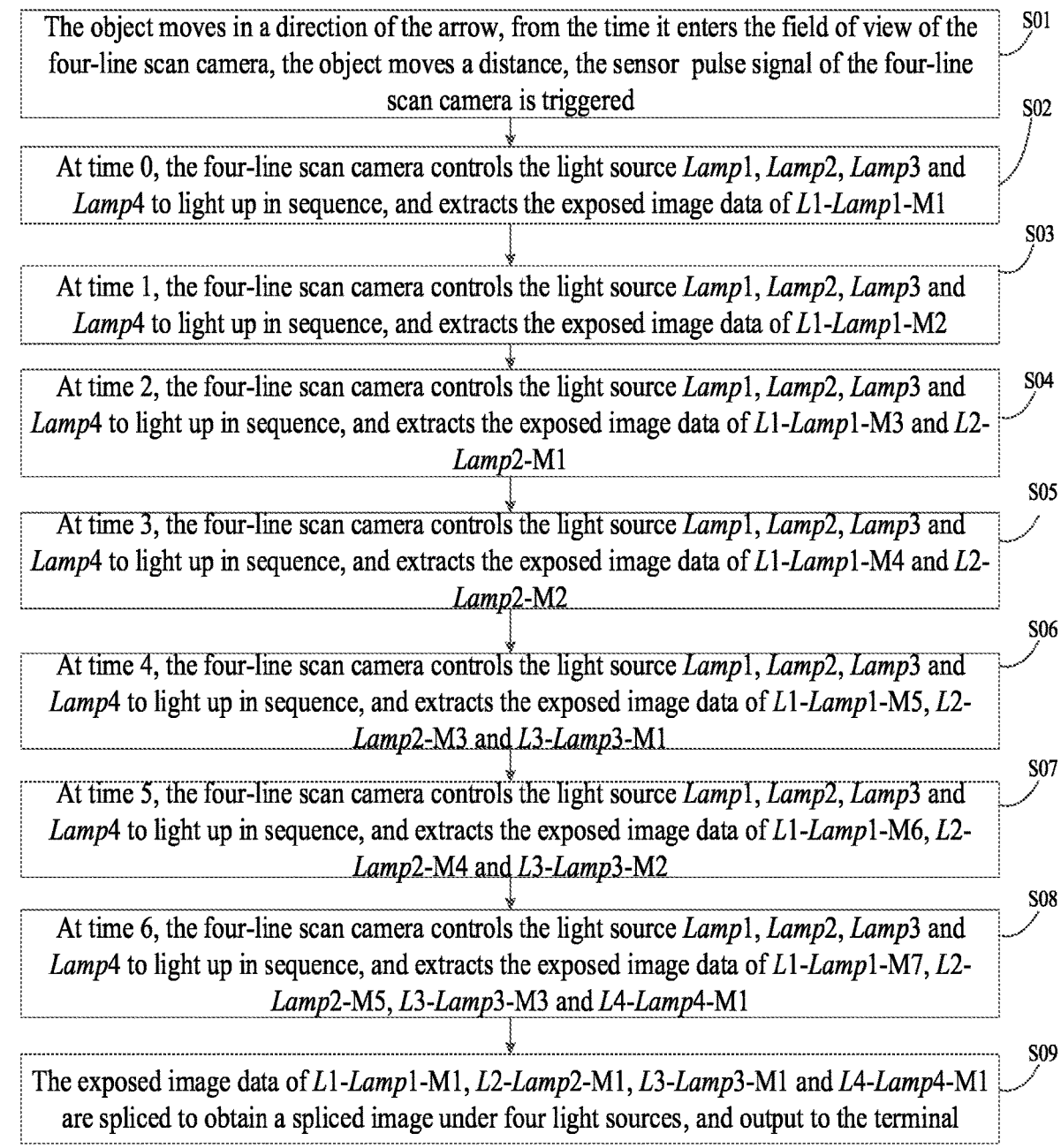
FIG. 3 is a flowchart of steps of the implementation method in the embodiment of FIG. 2.
Figure 4:
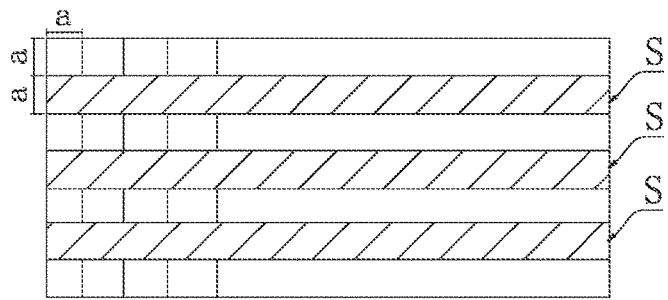
FIG. 4 is a schematic diagram of a number of sensor lines of a four-line camera in the embodiment of FIG. 2.

As an embodiment, as shown in FIG. 2, the above camera multi-line time-division exposure processing method is used to expose processing for the object. In this embodiment, the camera is selected as a four-line scan camera, and four light sources are used for image collection, that is, "four-line-four-lamp" mode. When scanning the object, an image under each light may be obtained, and then spliced into a large image, which is transmitted to the terminal (PC) for subsequent processing. It is equivalent to shooting the same object four times, corresponding to four light sources: Lamp1, Lamp2, Lamp3 and Lamp4, and the information under a plurality of illuminations of the same object surface may be obtained at one time. When each pixel of the sensor of the four-line scan camera is a×a, a plurality of pixels are arranged in a line, and the interval S is set between each line, the interval S is a, the sequence of the plurality of lines of the sensor is set as the first line of the sensor L1, the second line of the sensor L2, the third line of the sensor L3, and the fourth line of the sensor L4, so the four-line scan camera has a total of four sensor lines and three fixed distance intervals, as shown in FIG. 3. The object is imaged on the plurality of lines of the sensor through the lens of the four-line scan camera; there are four lights outside, which are controlled by the four-line scan camera; the four-line scan camera is in the external trigger collection mode, and the object moves through the camera's field of view in a certain direction. The magnification of the optical path is set as β. Since the pixel width in the motion direction is a, the interval of each block of the object surface is $\Delta l=a/\beta$. A single shot takes time T, and the object moves $\Delta l$ within time T, and a trigger signal of a trigger pulse is generated for each moving distance $\Delta l$. In order to simplify the description, a section of the object is selected, and the object is divided by the length of $\Delta l$ to obtain seven small blocks of the object.

As shown in FIGS. 2 and 3, in order to obtain the shooting situation of the four lights, it is necessary to associate each line of the sensor with a different light, and the mode of L1—Lamp1, L2—Lamp2, L3—Lamp3 and L4—Lamp4 may be taken, and the exposure process S01 to S06 is shown in FIGS. 2 to 6.

At S01, the object moves in a direction of the arrow, from the time it enters the field of view of the four-line scan camera, the object moves a distance $\Delta l$, and the sensor L1 pulse signal of the four-line scan camera is triggered;

At S02, at time 0, the four-line scan camera controls the light source Lamp1, Lamp2, Lamp3 and Lamp4 to light up in sequence, and extracts the exposed image data of L1—Lamp1—M1;

At S03, at time 1, the four-line scan camera controls the light source Lamp1, Lamp2, Lamp3 and Lamp4 to light up in sequence, and extracts the exposed image data of L1—Lamp1—M2;

At S04, at time 2, the four-line scan camera controls the light source Lamp1, Lamp2, Lamp3 and Lamp4 to light up in sequence, and extracts the exposed image data of L1—Lamp1—M3 and L2—Lamp2—M1;

At S05, at time 3, the four-line scan camera controls the light source Lamp1, Lamp2, Lamp3 and Lamp4 to light up in sequence, and extracts the exposed image data of L1—Lamp1—M4 and L2—Lamp2—M2;

At S06, at time 4, the four-line scan camera controls the light source Lamp1, Lamp2, Lamp3 and Lamp4 to light up in sequence, and extracts the exposed image data of L1—Lamp1—M5, L2—Lamp2—M3 and L3—Lamp3—M1;

At S07, at time 5, the four-line scan camera controls the light source Lamp1, Lamp2, Lamp3 and Lamp4 to light up in sequence, and extracts the exposed image data of L1—Lamp1—M6, L2—Lamp2—M4 and L3—Lamp3—M2;

At S08, at time 6, the four-line scan camera controls the light source Lamp1, Lamp2, Lamp3 and Lamp4 to light up in sequence, and extracts the exposed image data of L1—Lamp1—M7, L2—Lamp2—M5, L3—Lamp3—M3 and L4—Lamp4—M1;

At S09, the exposed image data of L1—Lamp1—M1, L2—Lamp2—M1, L3—Lamp3—M1 and L4—Lamp4—M1 are spliced to obtain spliced image under four light sources, and then output to the terminal.

Cycling S02 to S09 in turn, the exposed image data of M2, M3, M4, M5, M6 and M7 blocks under four light sources is obtained, the image data is respectively spliced to obtain the spliced image under the four light sources, and then output to terminal.

Figure 6:
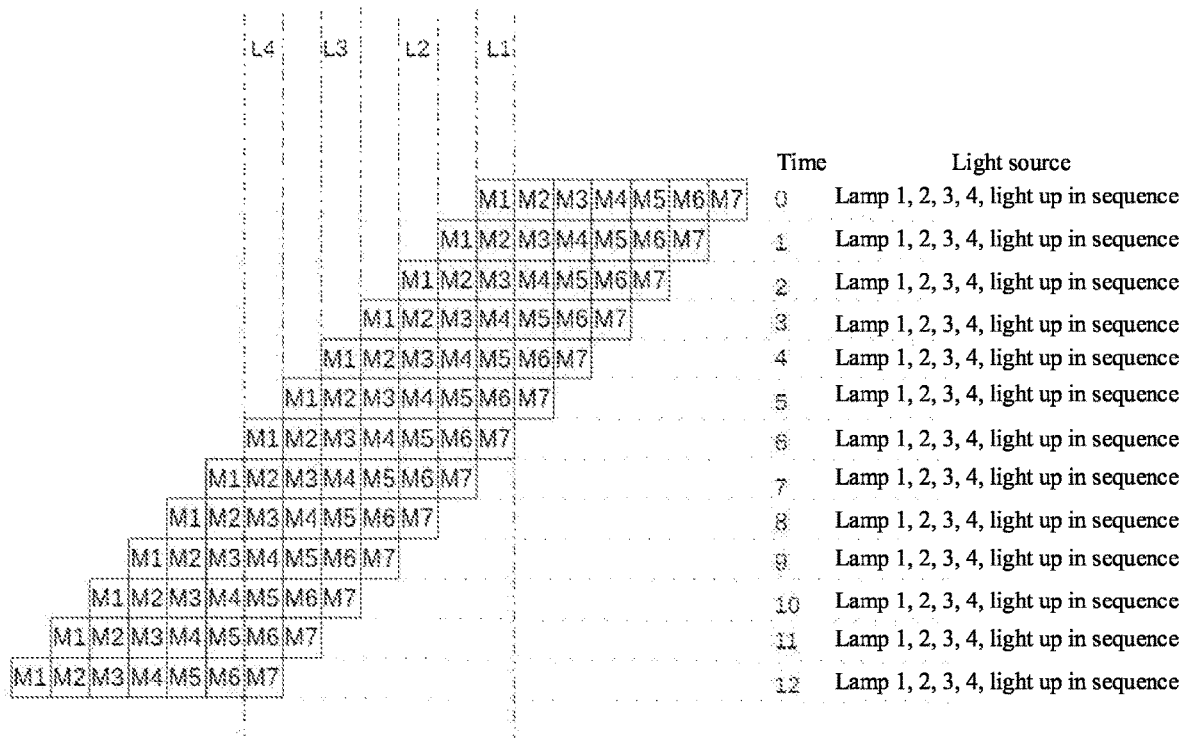
FIG. 6 is a schematic diagram of an image collection process in the embodiment of FIG. 2.

For the above steps S01 to S09, in order to simplify the description process and the imaging model, a static discrete approximate model is used. For the convenience of description, a section of the object is taken for analysis, such as parts 1 to 7 in FIGS. 2 and 6, the object moving speed is set as v, elapsed time is set as t, and moving distance is set as L=vt, output trigger pulse is set as n=L/Δl, and the number of the generated images is also set as n. When an object passes sequentially from right to left, the entire imaging process is shown in FIG. 6, which takes T as a unit interval time and is divided into different times. Starting from time 0, the object passes through the field of view, each line of the sensor captures a part of the object surface each time, and the same line scans all the object surfaces no more or no less. FIG. 6 shows the actual image collection process.

Figure 5:
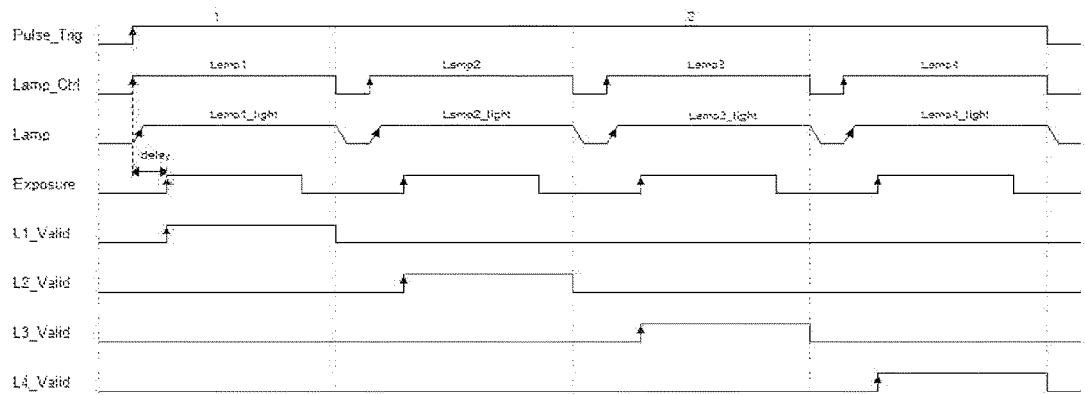
FIG. 5 is a schematic diagram of a sequential control of light sources in the embodiment of FIG. 2.

As shown in FIG. 5, in this embodiment, different caches are used to cache the data of different lines at different times, and the line delay is performed. The exposure has a certain delay relative to the time when the light source is turned on, which is to align the image data to obtain the image data of the same position under different light sources, and complete the normal combination of images.

As shown in FIGS. 2 to 6, when a four-line scan camera and four light sources cooperate to expose an object with an exposure band, the specific steps of image splicing are as follows.

At S001, the image data collected by the first line L1 of the sensor at time 0/1 is written into the first part of the image cache;

At S002, the image data captured by the first line L1 of the sensor at time 2/3 is written into the first part of the image cache; simultaneously, the image data captured by the second line L2 of the sensor is written into the second part of the image cache;

At S003, the image data captured by the first line L1 of the sensor at time 4/5 is written into the first part of the image cache; the image data captured by the second line L2 of the sensor is written into the second part of the image cache, and the image data captured by the third line L3 of the sensor is written into the third part of the image cache;

At S004, the image data captured by the first line L1 of the sensor at time 6/7 is written into the first part of the image cache; the image data captured by the second line L2 of the sensor is written into the second part of the image cache, and the image data captured by the third line L3 of the sensor is written into the third part of the image cache, the image data captured by the fourth line L4 of the sensor is written into the fourth part of the image cache;

At S005, the image data is aligned at time 6, the image data of the first line L1, the second line L2, the third line L3, and the fourth line L4 of the sensor at the object M1 are spliced to obtain a spliced image of the object M1 under different light sources;

At S006, images of objects 2 to 7 under different light sources are spliced in sequence, and the spliced images of objects 1 to 7 are transmitted to the terminal to obtain a complete image of the object in the selected segment.

The above process is continuously performed, and all the spliced images of the object are output to the terminal to obtain a complete image of the object.

Specifically, after the object passes through the camera's field of view, four images of the object under different light sources may be obtained, and after the integrated output, the image of the object under four different light sources is obtained.

It should be understood that the camera in this embodiment may be not a four-line scan camera, but other line scan cameras such as a two-line scan camera, a six-line scan camera, etc. In this embodiment, only a four-line scan camera is used to describe a method for illustrating exposure processing between a camera and a plurality of light sources.

Figure 7:
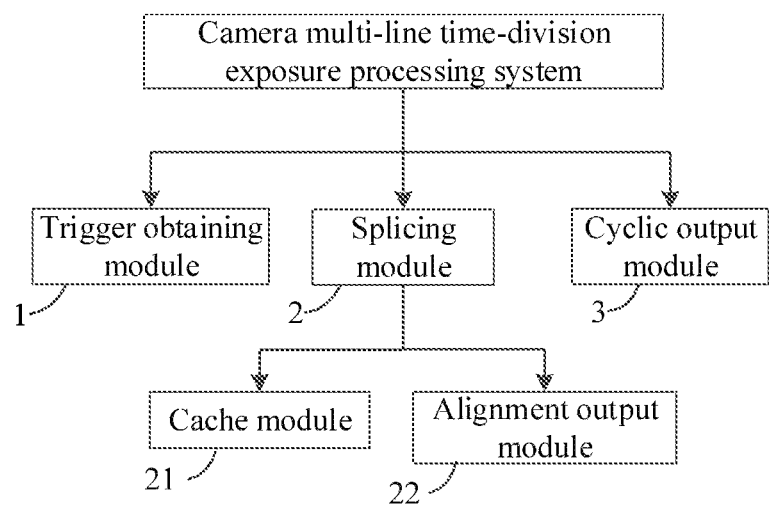
FIG. 7 is a schematic flowchart of a camera multi-line time-division exposure processing apparatus.

As shown in FIG. 7, a camera multi-line time-division exposure processing apparatus includes a camera and n light sources. The number of sensor lines of the camera is equal to the number of the n light sources and the sensor lines correspond to the n light sources in a one-to-one correspondence, and a plurality of sensor lines of the sensor lines are configured to respectively collect image data of an object moving through the camera's field of view along one direction under the corresponding light sources. The apparatus includes a trigger obtaining module 1, a splicing module 2 and a cyclic output module 3. The trigger obtaining module 1 is configured to: obtain a trigger signal to trigger at one time, based on the trigger signal, the n light sources to turn on and off sequentially, collect image data of the object exposed under a corresponding turned-on light source, and extract image data of the object obtained by one sensor line corresponding to the turned-on light source as valid data. The splicing module 2 is configured to splice, in response to that image data of a same portion of the object is collected by the plurality of sensor lines, all the valid data of the same portion of the object to obtain a spliced image under different light sources. The cyclic output module 3 is configured to cyclically output the spliced image to obtain a complete image of the object.

Further, the splicing module 2 includes a cache module 21 and an alignment output module 22. The cache module 21 is configured to write image data of the same portion of the object collected by the plurality of sensor lines at different times into a plurality of image caches. The plurality of image caches corresponds to the plurality of sensor lines in a one-to-one correspondence. The alignment output module 33 is configured to align the image data of the same portion in the plurality of image caches, and sequentially output the image data of the same portion of the object collected by the plurality of sensor lines to obtain the spliced image under different light sources.

A camera multi-line time-division exposure processing apparatus includes a memory having a computer program stored thereon; and a processor, where the computer program, when being executed by the processor, implements the following steps: obtaining a trigger signal to trigger at one time, based on the trigger signal, the n light sources to turn on and off sequentially, collecting image data of the object exposed under a turned-on light source, and extracting image data of the object obtained by one sensor line corresponding to the turned-on light source as valid data; splicing, in response to that image data of a same portion of the object is collected by the plurality of lines of the sensor, all the valid data of the same portion of the object to obtain a spliced image under different light sources; and cyclically outputting the spliced image to obtain a complete image of the object.

A computer-readable storage medium has a plurality of obtaining and classifying programs stored thereon, where the plurality of obtaining and classifying programs, when being called and executed by a processor, implements the following steps: obtaining a trigger signal to trigger at one time, based on the trigger signal, the n light sources to turn on and off sequentially, collecting image data of the object exposed under a turned-on light source, and extracting image data of the object obtained by one sensor line corresponding to the turned-on light source as valid data; splicing, in response to that image data of a same portion of the object is collected by the plurality of lines of the sensor, all the valid data of the same portion of the object to obtain a spliced image under different light sources; and cyclically outputting the spliced image to obtain a complete image of the object.

Those of ordinary skill in the art may understand that all or part of the steps of implementing the above method embodiments may be completed by program instructions related to hardware, the aforementioned program may be stored in a computer-readable storage medium, and when the program is executed, the steps including the above method embodiments are executed; and the aforementioned storage medium includes: ROM, RAM, magnetic disk or optical disk and other medium that may store program codes.

The above description is only a preferred embodiment of the present disclosure, but the protection scope of the present disclosure is not limited to this. In the technical scope of the present disclosure, equivalently replaces or changes according to the technical solution of the present disclosure and its inventive concept, made by those of ordinary skill in the art, should be included within the protection scope of the present disclosure.

What is claimed is:

1. A camera multi-line time-division exposure processing method, involving a camera and n light sources, wherein the number of N sensor lines of the camera is equal to the number of the n light sources, and the N sensor lines correspond to the n light sources in a one-to-one correspondence, a plurality of sensor lines of the N sensor lines beings configured to respectively collect image data of an object moving through the camera's field of view along one direction under the corresponding light sources, the method comprising:
obtaining a trigger signal to trigger at one time, based on the trigger signal, the n light sources to turn on and off sequentially, collecting image data of the object exposed under a turned-on light source, and extracting image data of the object obtained by one sensor line corresponding to the turned-on light source as valid data;

splicing, in response to that image data of a same portion of the object is collected by the plurality of lines of the sensor, all the valid data of the same portion of the object to obtain a spliced image under different light sources; and cyclically outputting the spliced image to obtain a complete image of the object, wherein in said splicing, in response to that image data of the same portion of the object is collected by the plurality of lines of the sensor, all the valid data of the same portion of the object to obtain the spliced image under different light sources, said splicing the valid data comprises:

writing image data of the same portion of the object collected by the plurality of sensor lines at different times into a plurality of image caches, wherein the plurality of image caches corresponds to the plurality of sensor lines in a one-to-one correspondence; and aligning the image data of the same portion of the object in the plurality of image caches, and sequentially outputting the image data of the same portion of the object collected by the plurality of sensor lines to obtain the spliced image under the different light sources.

2. The camera multi-line time-division exposure processing method according to claim 1, wherein in said obtaining the trigger signal to trigger at the time, based on the trigger signal, the n light sources to turn on and off sequentially, collecting the image data of the object exposed under the turned-on light source, said obtaining the trigger signal comprises:

obtaining a trigger signal triggered by each moving length $\Delta l$ of the object, wherein the length $\Delta l$ corresponds to a length $\Delta l$ of the object that is collectable by each sensor line, the object being divided equally based on the length $\Delta l$.

3. The camera multi-line time-division exposure processing method according to claim 1, wherein when the image data of the same portion in the plurality of image caches are aligned, a line delay is performed on the plurality of sensor lines to align the image data of the same portion.

4. The camera multi-line time-division exposure processing method according to claim 1, wherein the n-th light source is set as Lamp_n, the n-th sensor line of the camera is set as Ln, and a correlation relationship between Lamp_n and Ln is that: when Lamp_n is turned on, the image data obtained by Ln under a turned-on light source Lamp_n is extracted.

5. The camera multi-line time-division exposure processing method according to claim 1, wherein the plurality of sensor lines of the camera each is arranged in a line and spaced apart from each other by a fixed distance; and when a pixel of the camera is set as a×a, the fixed distance is set as a.

6. A camera multi-line time-division exposure processing apparatus, comprising:

a memory having a computer program stored thereon; and a processor, wherein the computer program, when being executed by the processor, implements the method according to claim 1.

7. A non-transitory computer-readable storage medium, having a plurality of obtaining and classifying programs stored thereon, wherein the plurality of obtaining and classifying programs, when being called and executed by a processor, implements the method according to claim 1.

8. A camera multi-line time-division exposure processing apparatus, comprising a camera and n light sources, wherein the N number of sensor lines of the camera is equal to the number of the n light sources and the N sensor lines correspond to the n light sources in a one-to-one correspondence, a plurality of sensor lines of the N sensor lines being configured to respectively collect image data of an object moving through the camera's field of view along one direction under the corresponding light sources, the apparatus comprising:

a trigger obtaining module configured to obtain a trigger signal to trigger at one time, based on the trigger signal, the n light sources to turn on and off sequentially, collect image data of the object exposed under a corresponding turned-on light source, and extract image data of the object obtained by one sensor line corresponding to the turned-on light source as valid data;

a splicing module configured to splice, in response to that image data of a same portion of the object is collected by the plurality of sensor lines, all the valid data of the same portion of the object to obtain a spliced image under different light sources; and a cyclic output module configured to cyclically output the spliced image to obtain a complete image of the object, wherein the splicing module comprises:

a cache module configured to write image data of the same portion of the object collected by the plurality of sensor lines at different times into a plurality of image caches, wherein the plurality of image caches corresponds to the plurality of sensor lines in a one-to-one correspondence; and an alignment output module configured to: align the image data of the same portion in the plurality of image caches, and sequentially output the image data of the same portion of the object collected by the plurality of sensor lines to obtain the spliced image under different light sources.

* * * * *